(12) United States Patent
Williamson

(10) Patent No.: US 8,295,980 B2
(45) Date of Patent: Oct. 23, 2012

(54) DEPLOYMENT APPARATUS AND METHOD

(75) Inventor: Rhoderick John Williamson, Hamilton (NZ)

(73) Assignee: Gea Avapac Limited, Hamilton (NZ)

( * ) Notice: Subject to any disclaimer, the term of this patent is extended or adjusted under 35 U.S.C. 154(b) by 1016 days.

(21) Appl. No.: 11/629,255

(22) PCT Filed: Jun. 13, 2005

(86) PCT No.: PCT/NZ2005/000129
§ 371 (c)(1),
(2), (4) Date: Dec. 2, 2008

(87) PCT Pub. No.: WO2005/120184
PCT Pub. Date: Dec. 22, 2005

(65) Prior Publication Data
US 2009/0081006 A1    Mar. 26, 2009

(30) Foreign Application Priority Data

Jun. 11, 2004   (NZ) ........................................ 533533

(51) Int. Cl.
*B65H 7/14* (2006.01)
(52) U.S. Cl. ..................... 700/259; 700/213; 414/222.02
(58) Field of Classification Search .................. 700/259, 700/213, 218, 245; 901/10, 46, 47; 414/222.02
See application file for complete search history.

(56) References Cited

U.S. PATENT DOCUMENTS

| | | | |
|---|---|---|---|
| 4,305,130 A * | 12/1981 | Kelley et al. ................. | 700/259 |
| 4,860,879 A | 8/1989 | Harsch et al. | |
| 5,302,079 A | 4/1994 | Cestonaro et al. | |
| 5,379,347 A * | 1/1995 | Kato et al. ..................... | 382/141 |
| 5,987,591 A * | 11/1999 | Jyumonji ...................... | 700/259 |
| 6,599,081 B1 * | 7/2003 | Blidung et al. ............. | 414/796.4 |
| 6,665,588 B2 | 12/2003 | Watanabe et al. | |
| 6,718,229 B1 * | 4/2004 | Takebayashi et al. ........ | 700/217 |
| 2003/0018414 A1 * | 1/2003 | Watanabe et al. ............. | 700/259 |
| 2003/0088337 A1 * | 5/2003 | Watanabe et al. ............. | 700/259 |
| 2004/0167663 A1 * | 8/2004 | Hiatt et al. .................... | 700/213 |

FOREIGN PATENT DOCUMENTS

WO    WO 02/062689 A1    8/2002

OTHER PUBLICATIONS

PCT/NZ2005/000129, International Search Report, Date of Mailing Oct. 26, 2005, 3 pages.
PCT/NZ2005/000129, Written Opinion of the International Searching Authority, Date of Mailing Oct. 26, 2005, 3 pages.
PCT/NZ2005/000129, International Preliminary Report on Patentability, Date of Completion Apr. 26, 2006, 16 pages.

* cited by examiner

*Primary Examiner* — Khoi Tran
*Assistant Examiner* — Jason Holloway
(74) *Attorney, Agent, or Firm* — Blakely, Sokoloff, Taylor & Zafman LLP

(57) ABSTRACT

A deployment apparatus (1) adapted to remove articles (14) located on a support surface (5), the articles (14) being located in a plurality of orientations and positions on the support surface (5). The deployment apparatus (1) includes; an article detector (2) capable of determining an orientation and position of at least one article located on the support surface (5), a removal system (4) capable of engaging with and removing an article (14) from the support surface (5), a maneuvering system (3) capable of positioning the removal system (4) to engage with a selected article and deploying an engaged article to a predetermined position and/or orientation.

38 Claims, 6 Drawing Sheets

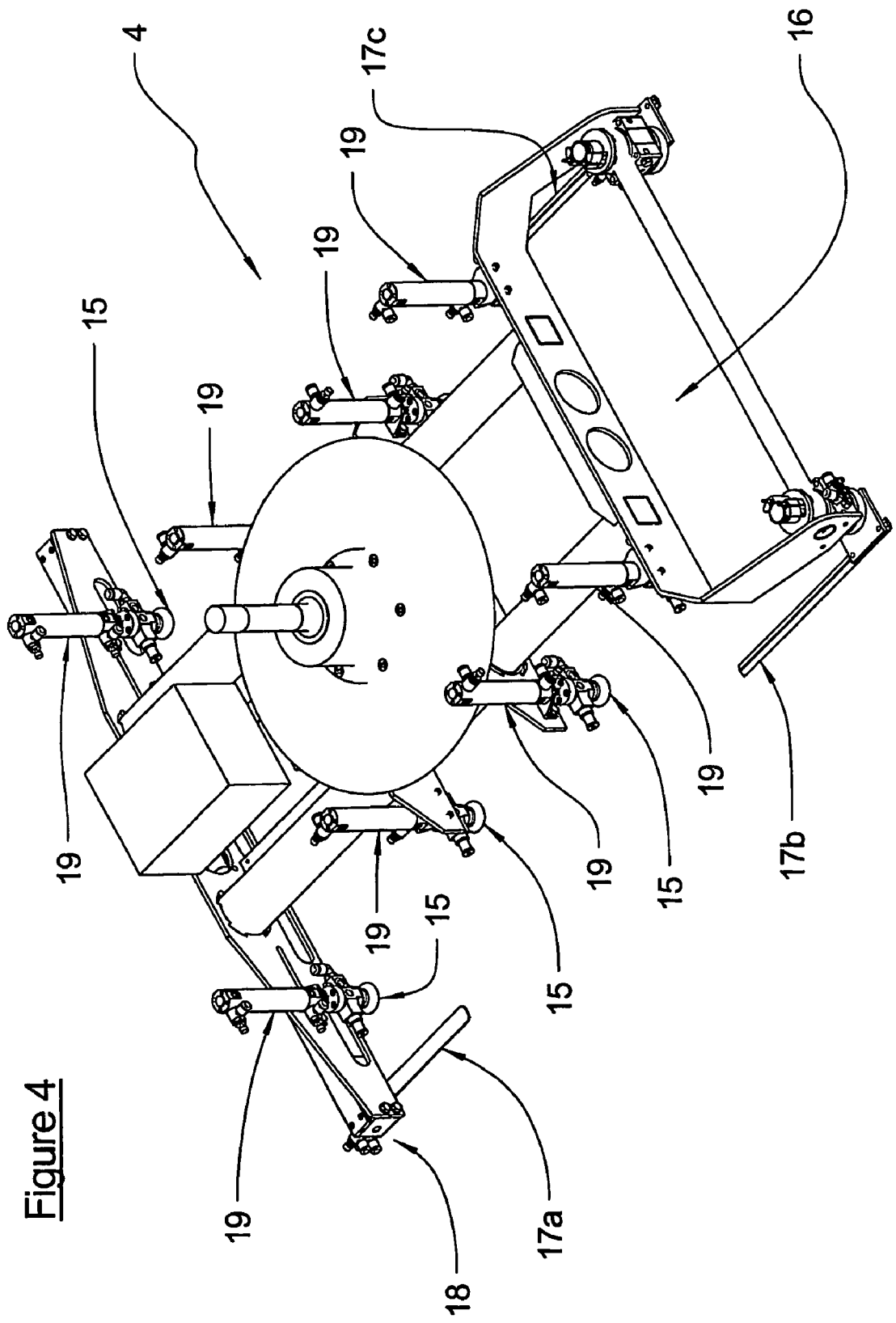

DEPLOYMENT APPARATUS AND METHOD

CROSS-REFERENCE TO OTHER APPLICATIONS

This is a National Phase of International Application No. PCT/NZ2005/000129, filed on Jun. 13, 2005, which claims priority from New Zealand Patent Application No. 533533, filed on Jun. 11, 2004.

TECHNICAL FIELD

This invention relates to a deployment method and apparatus. Preferably the present invention may be adapted to select and supply articles to a production line. Reference throughout this specification will also be made to the present invention being used to select, remove and deploy a bag or other packaging article from a stack of bags or packaging articles located on a pallet, but those skilled in the art should appreciate that other applications or configurations of the present invention are also envisioned.

BACKGROUND ART

A number of large scale industrial manufacturing processes consume significant volumes of empty packaging materials. These packaging materials are generally filled with a processed commodity or product. Such production lines can be fed with empty stock packaging materials such as box blanks or empty pre-made bags. For a number of manufacturing production lines, such as for example, those associated with producing packaged milk powder, an empty bag is generally manually removed from a stack of empty bags stored on a pallet. In the case of milk powder packaging lines for example, comparatively large capacity 25 or 50 kilo bags are packed into stacks onto a pallet.

Due to the geometry of the bags employed, a number of variable bag orientations need to be used to efficiently stack the highest possible number of bags onto a pallet. This variation in bags stack orientation normally requires a human operator to identify and select a particular bag for depalletisation, while also ensuring that the overall height of the stacks on the pallet remain consistent and the load on the pallet remains stable.

However, the use of manual labour of the depalletising of bags does involve some drawbacks and disadvantages.

Manual labour represents a direct cost in the manufacturing process involved, and also requires operator training and operator safety procedures to be implemented and followed. Operator error or negligence may also cause manufacturing losses and potentially damage to plant or equipment.

However, the use of manual labour of the depalletising of bags does involve some drawbacks and disadvantages.

Manual labour represents a direct cost in the manufacturing process involved, and also requires operator training and operator safety procedures to be implemented and followed. Operator error or negligence may also cause manufacturing losses and potentially damage to plant or equipment.

There are many systems used in manufacturing that determine the orientations of objects or articles in order to ensure that the manoeuvring, machining or any other action to be taken on the object is accurate and efficient. U.S. Pat. No. 6,665,588 describes a work-piece removal system used to accurately remove car parts or other items in an assembly line. A laser or other range finding device is used to scan each object in the line and determine its orientation. This information is then analysed in order to direct a robotic arm to remove the work-piece. While this system is useful in ensuring accurate removal of work-pieces in a line it cannot determine the orientations and positions of multiple objects simultaneously. Also this system cannot compensate for a plurality of objects distributed unevenly or in many orientations and/or configurations.

It would be preferable to have an alternative system for the deployment of empty packaging materials or any other articles within a manufacturing process. In particular, it would be preferable to have an automated system, method or apparatus for extracting a bag, package or other object stored on a pallet or other support structure.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a deployment apparatus adapted to remove articles located on a support surface, said articles being located in a plurality of orientations and/or positions on said support surface, said deployment apparatus including,
  an article detector capable of determining an orientation and position of at least one non-overlapped article located on said support surface, and
  a removal system capable of engaging with and removing an article from said support surface, and
  a manoeuvring system capable of positioning the removal system to engage with a selected article and deploying an engaged article to a predetermined position and/or orientation.
  wherein said article detector is capable of receiving or generating an image of the articles on the work surface and includes, or is operatively interfaced with, a processing means capable of selecting a non-overlapped article for removal from the support surface according to at least one selection criteria, said processing means being capable of analyzing the image of the articles to determine the position and orientation of non-overlapped articles.

Preferably, said articles are packaging articles. However, it will be appreciated that the present invention may utilise articles of any convenient form, including filled and un-filled packaging articles, solid objects, semi-rigid objects and/or any other article capable of maintaining a definable or recognisable outline or shape or image. Reference in the specification to articles being packaging articles is for exemplary purposes only and the invention is not limited to same.

Thus, each selected article may be deployed into the same predetermined position and/or orientation (e.g. onto a conveyor) or into a sequence of position, e.g. to stack articles in a regular configuration into a larger container. The present invention may even be utilised to re-stack/re-sort disorganised articles into a particular order/orientation on the same work surface.

According to one embodiment, the article detector, removal system and/or manoeuvring system may be formed as a combined device or as distinct capabilities of a common apparatus/mechanism.

As used herein, a processing means includes any convenient computational means including stand-alone personal computers (PC), mobile computers, and so forth, embedded controllers, dedicated processing devices integrated into a specific deployment apparatus control system, and/or remotely monitored and operated computer systems.

Dependant on the particular configuration of articles being removed and reoriented, the removal system may be correspondingly shaped to match the general outline of the article. Thus, if the articles were substantially rectangular, forming the removal system in a substantially rectangular configuration provides the means for engaging with a greater proportion of the article. Thus, according to a further aspect of the present invention, the manoeuvring system is capable of aligning the removal system with an orientation of a selected article.

However, it will be appreciated that the removal system need not necessarily be aligned-with the selected article provided engagement with the selected article does not overlap with non-selected articles.

According to a further aspect of the present invention there is provided a method of deploying articles, said articles being located on a support surface in a plurality of orientations, said method of deployment being characterised by the steps of:
  determining an orientation and position of at least one selected non-overlapped article using an article detector, and
  manoeuvring a removal system into engagement with the selected article
  moving the selected article to a predetermined position and/or orientation.
In one embodiment, the method further includes;
  aligning the removal system with an orientation of a selected article.

The present invention is adapted to provide a deployment method and apparatus. Such a method and apparatus may be implemented to deploy a large number of individual articles on demand, preferably without need for the involvement of a manual operator.

In a preferred embodiment packaging articles employed in conjunction with the present invention may be formed as an initially empty, open-ended bag. Packaging bags are well known in the packaging industry and have many varied applications and uses. Reference throughout this specification will also be made to the packaging articles employed in conjunction with the present invention being paper bags. However, those skilled in the art should appreciate that other types of packaging articles; such as for example boxes (whether erected or still in blank form), or bags made from other materials (such as plastic or composite materials) may also be deployed in conjunction with the present invention if required and reference to the above only throughout this specification should in no way be seen as limiting.

Reference throughout this specification will also be made to the bags deployed being supplied to production lines for subsequent filling by particulate materials, such as for example, milk powder or any other form of dry powder. Comparatively large capacity (for example 25 or 50 kilo) paper bags may be deployed in conjunction with the present invention and be subsequently filled and sealed closed.

In such applications, comparatively high volumes of powder need to be packaged, thereby requiring a significant number of bags to be deployed or supplied to a production line both on time and in the correct orientation for subsequent automated filling. However, those skilled in the art should appreciate that other types of materials and also other types of production lines may also package articles deployed in conjunction with the present invention, and reference to the packaging of milk powder in the main throughout this specification should in no way be seen as limiting.

Preferably the deployment apparatus provided may be adapted to remove bags from a support surface on which these bags are stored or transported. In a further preferred embodiment the support surface involved may be provided through the top surface of a pallet. Pallets are well known in manufacturing applications and can be lifted through apertures in their base sections by forklifts. Large volumes and weights of empty packaging articles or materials can be stored and easily transported on pallets and also manoeuvred adjacent to a production line. However, those skilled in the art should appreciate that other types of support surface may also be employed and reference to the above only throughout this specification should in no way be seen as limiting.

Preferably the present invention may be adapted to remove bags stacked on the surface of a pallet where these bags and their associated stacks can have a number of different orientations on the surface of the pallet. Variable stack orientations allow the maximum surface utilisation for a pallet to be achieved if the dimensions of the bag to be depalletised do not suit the dimensions of the top surface of the pallet.

Reference throughout this specification will also be made to the bags deployed being organised or grouped into collections such as regular stacks on the surface of the pallet, where a number of stack or bag orientations are employed to maximise the number of bags which a pallet can carry when fully loaded. However, those skilled in the art should appreciate that all bags carried by a pallet need not be organised or collected into regular stacks in other embodiments if required. The present invention may in such instances operate to depalletise or deploy bags which are not stacked in regular arrays but which still have a plurality of orientations with respect to the surface of the pallet involved.

In a preferred embodiment the packaging deployment apparatus provides an article detector. Such a detector system or subsystem can be used to determine the position and/or orientation of at least one bag or stack of bags on the surface of the pallet, and also preferably be able to indicate to other components or subsystems of the deployment apparatus the orientation and position determined.

In a preferred embodiment an article detector may receive, generate or otherwise employ an optical image of articles such as bags stacked or otherwise stored on a pallet. Such an optical image may be generated using known imaging technology and be analysed by said processor means to determine or a position and/or orientation of at least one article using software-based image processing techniques.

Preferably, said optical image is analysed by said processing means to identify non-overlapped articles and determine their position and orientation. Thus, for images taken as top plan views of assorted bags on a pallet provides information regarding the orientation of bags with respect to a substantially horizontal plane.

In a preferred embodiment an article detector may include or be adapted to receive image data from a digital camera system or other similar technology. Digital camera systems are well known and relatively inexpensive, and can provide input data to software based image processing systems in well known formats.

Reference throughout this specification will also be made to an article detector incorporating a digital camera. However, those skilled in the art should appreciate that other forms of image acquisition systems may also be employed if required and reference to optical camera systems only throughout this specification should in no way be seen as limiting. For example, in some alternative embodiments, analogue electrical signals from charged coupled devices, or alternatively any other form of image generation and/or acquisition system may be employed in conjunction with the present invention if required.

In a further preferred embodiment a packaging article detector may solely include a single camera system orientated or positioned directly above a pallet from which bags are to be deployed. This implementation of an article detector allows the single camera involved to provide a clear view or image of the state of the top of the loaded pallet and hence the orientations of the bags currently available for deployment to a production line.

Reference throughout this specification will also be made to the article detector including a single camera system located substantially directly above a pallet from which bags are to be removed. However, those skilled in the art should appreciate that stereoscopic or other multi-camera systems may also be employed in conjunction with the present invention if required, and reference to the above only throughout this specification should in no way be seen as limiting.

In a preferred embodiment, said image acquired by the article detector is analysed by said processing means programmed in accordance with computer software or other related algorithms to identify one or more predetermined identification features present on each article. According to one embodiment, said predetermined identification features include, discernable colour and/or contrast patterns, advertisings paraphernalia, nutritional information, bar codes, opening instructions, peripheral markings, asymmetrical perimeters, geometrical markings and the like.

Identification of one or more said identification features enables the orientation of a bag to be determined. For example, in one preferred embodiment, advertising logos, opening instructions or other printed information applied to a surface of an empty bag may be used to determine the orientation of a bag through comparison with a standard template image. This may also allow the perimeter or edges of an article to be identified through interpolation with given known dimensions of the article. Furthermore, in other alternative embodiments, edge contrast detection algorithms may also be employed to again detect whether the perimeter of a single bag lies to subsequently determine and indicate an orientation of an article.

To identify the particular orientation of an article, the apparatus requires 'training' to recognise and distinguish between all the possible orientation permutations. This is performed by placing an article at a series of known orientations and associating the corresponding image generated by article detector with the particular orientation. Dependant on the particular characteristics of the article, the apparatus may be programmed to recognise one or more predetermined identification features on the article through the range possible orientations, and preferably also the proximity and perspective of the article to the article detector. Thus, according to a preferred embodiment, the processing means is provided with a reference image database of reference images of articles including at least one predetermined identification feature at known article orientations.

Preferably, said article orientations include all the possible angular and positional permutations. It will be appreciated however that in some embodiments where articles are only positioned on the support surface in restricted orientation permutations, the reference image database may be restricted to images corresponding to said restricted orientation permutations.

According to a further aspect, the processing means compares the image acquired by the article detector with said reference image database to determine orientation of the article. Preferably, said determination includes weightings for at least one of; positional correctness; image match with at least one predetermined identification feature; size; and scaling comparison with said reference image data.

Thus, after an image is acquired from the article detector and compared to the reference image database and the position and orientation of one or more articles are identified, the processing means determines the priority of articles to be selected for engagement with the removal system.

Preferably, the priority for designating successive articles for selection is restricted to articles being;
- non-overlapped by another article; or
- uppermost or outermost from the support surface; or
- closest to a designated reference point or axis; or
- closest to alternating designated reference points or axes; or
- located over the position of maximum weight applied by the articles to the support surface.

In a preferred embodiment the processing means associated with the article detector determines the selected article priority by utilising an article selection algorithm or subsystem. Such an algorithm may consider the particular orientations of the bags available for deployment in conjunction with other factors such as position, proximity to the removal system and height, thus being able to select a particular bag for optimised deployment efficiency and effectiveness.

In a further preferred embodiment, the article detector determines the article uppermost from the support surface from one or more position sensors. The height information from the position sensors height information may in turn be used in conjunction with selection algorithms employed by the article detector to select and engage a particular bag. The height of the bags available for deployment can be considered to keep the height of stacks of bags on a pallet relatively consistent, thereby ensuring the load on the pallet is not destabilised.

For example, in one preferred embodiment a article detector may include a series of height based position sensors operating across the top surface of a loaded pallet. In such an embodiment low energy electromagnetic beams may be transmitted across the surface of a pallet where the interruption of a beam will indicate that the bags loaded on the top of the pallet are at least at the height of the beam broken. Those skilled in the art should appreciate that energy from across the electromagnetic spectrum, such as for example, infrared, visible light or ultraviolet light beams may all be employed in conjunction with the present invention.

Standard infrared emission and detection systems may be employed in such applications with an array of detectors and emitters being positioned around the edges of a loaded pallet at a specific height. In such an embodiment the pallet may be raised or lowered to a position where the majority of these beams are broken by the top few bags in the top surface of a loaded pallet. Subsequent deployment of further bags may therefore lower the top surface of the pallet at specific regions, and indicate alternative areas of the pallet that should have bags removed.

However, in another alternative embodiment, optical or electromagnetic beam ranging finding based systems may be employed to obtain the bag height information discussed above. For example, in such an alternative embodiment, a laser range finding system may be employed to scan the top surface of a loaded pallet to provide range information, and potentially a 3-dimensional profile of the top surface of the pallet for subsequent use in conjunction with a bag selection algorithm.

In a further embodiment, the support surface is automatically raised by a drive mechanism until an uppermost article interrupts a beam transmitted by the height position sensors.

In a preferred embodiment a packaging article detector transmits the orientation and position of a selected article to the manoeuvring system used to orientate said removal system for engagement with the selected article. The orientation and position of the selected article may be transmitted through control signals and instructions issued to a manoeuvring means, or alternatively through a data file or information transmission supplied to the manoeuvring system as described in other embodiments.

In a preferred embodiment a manoeuvring system may be implemented through any form of mechanical or electromechanical system capable of manoeuvring the removal system through a 3-dimensional range of movements. Such a manoeuvring system may be employed to orientate a removal system where the 3-dimensional movement capacity provided allows for variations in the positions and orientations of bags to be deployed. Those skilled in the art should appreciate that a plurality of axes of motion may be available to such a manoeuvring system utilised in conjunction with the present invention. For example, in a further preferred embodiment, a manoeuvring system may be provided with four distinct axes for linear and/or rotational movement.

In one example, an articulated robotic arm may be employed as a manoeuvring system with said removal system attached to the free end of such an articulated arm.

However, in a preferred embodiment a manoeuvring system may be implemented through an array of tracks and carriages which can manoeuvre a removal system head within a substantially horizontal plane orientated parallel to the top surface of the work surface. In such an embodiment the manoeuvring system may also incorporate height adjustment systems or drive mechanism of some form to adjust the height of the removal system head relative to the articles on a pallet or other the working surface.

In such an embodiment the working head of a packaging removal system may be mounted by a drive shaft which can be raised, lowered or rotated by components of the manoeuvring means. Said drive mechanisms may include pallet height-adjustment systems may also be employed to lift or lower the entire loaded pallet of bags to adjust the height of the bags to be deployed with respect to the packaging removal system involved.

Reference throughout this specification will also be made to the manoeuvring system employing an array of tracks and carriages to manoeuvre the removal system in a substantially horizontal plane, in addition to a drive shaft and a pallet lifting mechanism adapted to provide vertical adjustments of the packaging removal system with respect to a pallet. However, those skilled in the art should appreciate that other types of manoeuvring system may also be employed in conjunction with the present invention and reference to the above only throughout this specification should in no way be seen as limiting.

According to a further aspect of the present invention there is provided a removal system configured to remove at least one article located on the support surface, said packaging removal system including at least one retention mechanism adapted to removably connect an article to the removal system.

According to yet another aspect of the present invention there is provided a removal system substantially as described above which also includes at least one parting element adapted to at least partially project between an article to be removed and an adjacent article, whereby a parting element is movable in use to sever a connection between an engaged article and an adjacent article.

A retention mechanism may be used to grasp the selected article from the work surface whereby subsequent movement of either the retention mechanism or alternatively the entire removal system will result in the removal of the selected article from the work surface.

In a further preferred embodiment a retention mechanism is adapted to move relative to a base mounting frame of a packaging removal system. Providing for relative movement of a retention mechanism allows at least a portion of a bag to be moved relative to the base mounting frame involved. The movement of a retention mechanism will allow fine control of forces applied at least initially to a bag to be deployed.

In a preferred embodiment a retention mechanism incorporates one or more vacuum cups. Vacuum cups can be used to provide a removable connection to a bag to be deployed on the application of a vacuum or low pressure to the interior of the cup. Vacuum cups can be implemented through existing automation and production line technology and can function reliably as a retention mechanism in conjunction with the present invention.

However, those skilled in the art should appreciate that other forms, types or implementations of retention mechanisms may also be employed in conjunction with the present invention and reference to the use of vacuum cups only throughout this specification should in no way be seen as limiting. Electrostatically charged pads, mechanical grasping hands or clamps, or tacky adhesive based systems may for example all be employed as retention mechanisms in other embodiments if required.

In a preferred embodiment a packaging removal system includes a plurality of retention mechanism disposed in a regular array along or on a mounting frame of the removal system. This array of retention mechanism (or preferably vacuum cups) can be used to grasp or connect various areas or portions of a top surface of a selected article as required in the operation of the packaging removal system.

In a preferred embodiment the removal system includes at least one parting element adapted to at least partly project between a selected article engaged by the removal system head and an adjacent article located beneath the selected article. A parting element may be used to sever or disrupt connections between adjacent bags to free the uppermost, or outermost article bag for deployment, and to ensure that the adjacent lower bag is not also grasped, removed or disturbed by the operation of the removal system. Those skilled in the art should appreciate that a connection may be formed between two adjacent bags in a number of ways, such as for example, a static electrical charge connection or alternatively through the bleeding of adhesive used to close or form either of the bags provided.

In a preferred embodiment the portion of a parting element which is to project between a bag to be deployed and the adjacent bag on a stack may be adapted to move across the underside of a bag selected for deployment to sever connections or attachments between two adjacent bags. The projecting portion of the parting element is configured to sweep across or through an area on the underside of a bag to subsequently free the bag for deployment.

This facility provided by a parting element is used in a preferred embodiment to sever any glue or adhesive based connections between two adjacent bags when these bags are used in a milk powder packaging production line. Glue is generally employed on the seams of such bags to strengthen the bag and to ensure it remains closed at its seams. However, bags stacked and compressed together on a pallet will experience bleeding of adhesive from the glued seams, which can in turn result in adjacent bags on a stack becoming adhered together. The use of a parting element within such a packaging removal system may therefore sever such adhesive based connections and allow a single bag only to be deployed at any one time.

In one embodiment the body of a parting element in operation is pivotable through an arc underneath the surface of a selected bag. Optionally, a pivoting parting element is used to free or clear the corner sections of a bag for subsequent removal from a stack or pallet.

In other instances a parting element is driven or moved linearly, parallel to an edge of a bag. Such a 'linear' parting element can be used to free a portion of the perimeter of a bag prior to the bag being removed from the stack or pallet.

In a further preferred embodiment a packaging removal system includes a plurality of parting elements to sever connections between the bag to be deployed and the lower or adjacent bag in the stack in various regions in the underside of the bag to be deployed.

For example, in a preferred embodiment a combination of a pair of pivoting parting elements and a single linear parting element may be employed to free two adjacent corners of a bag while the entire opposite end of the edge of a bag may be free by the linear parting element. This configuration of a packaging removal system will sweep a parting element over all regions or sections of the underside of the bag where there is a likelihood of a bag being connected, attracted or adhered to an adjacent bag.

In a preferred embodiment where a packaging removal system includes a plurality of retention means, the system may operate to initially connect all retention members to the top surface of a bag to be deployed. However, after all retention members have been connected, a selected retention member or members may be moved relative to the removal system to lift or otherwise move a selected portion only of the bag to be depalletised. At this stage a parting element associated with or incorporated into the removal system may be operated to project underneath the portion of the bag lifted and to subsequently move through its standard range of motion to sever any connections from the bag being removed and the adjacent bag on the stack. Once these operations have occurred, further retention members may be moved relative to the main body of the removal system to in turn lift the entire bag or portions of same, thereby again allowing additional parting elements to be operated to free the bag from any connection to an adjacent lower bag in a stack.

For example, in one preferred embodiment, a single retention member or vacuum cup connected to the corner of a bag to be deployed may be lifted and a linear parting element run from the lifted corner of the bag along the perimeter or edge of the bag. Once the linear parting bag has finished its run, all other remaining vacuum cups or retention members may be lifted with respect to the removal system and any further or remaining parting elements may then be activated to implement the stage lifting operation.

Preferably once a packaging removal system has been connected to and has subsequently lifted a single bag only, the manoeuvring system may move the lifted bag out away from the top area of a pallet and over a conveyor line or conveyor system. The manoeuvring system may then adjust their orientation or position of the removal system to place the bag to be deployed in a selected or standard orientation. At this stage the removal system may be lowered close to such a conveyor and the retention mechanism of the removal system may be released to subsequently deploy the bag into the production line involved.

The present invention may provide many potential advantages over the prior art.

A packaging deployment apparatus as configured in conjunction with the present invention may be employed to automate the supply of packaging articles to a production line used to fill such articles. Packaging articles such as bags or boxes which can have a variety of orientations on a support surface such as a pallet may be identified and subsequently selected for deployment using the present invention. Automated manoeuvring and removal systems may then be engaged to retrieve and remove a selected packaging article and deliver this article on to a feed-in conveyer line in a standard filling orientation.

This eliminates the need for operator assistance or manual labour in the deployment of packaging articles, thereby potentially reducing overall manufacturing costs and the potential for operator error and workplace accidents.

BRIEF DESCRIPTION OF DRAWINGS

Further aspects of the present invention will become apparent from the following description which is given by way of example only and with reference to the accompanying drawings in which:

FIG. 4 shows a perspective view of the packaging removal system illustrated in FIGS. 1 and 2.

BEST MODES FOR CARRYING OUT THE INVENTION

Figure 1:
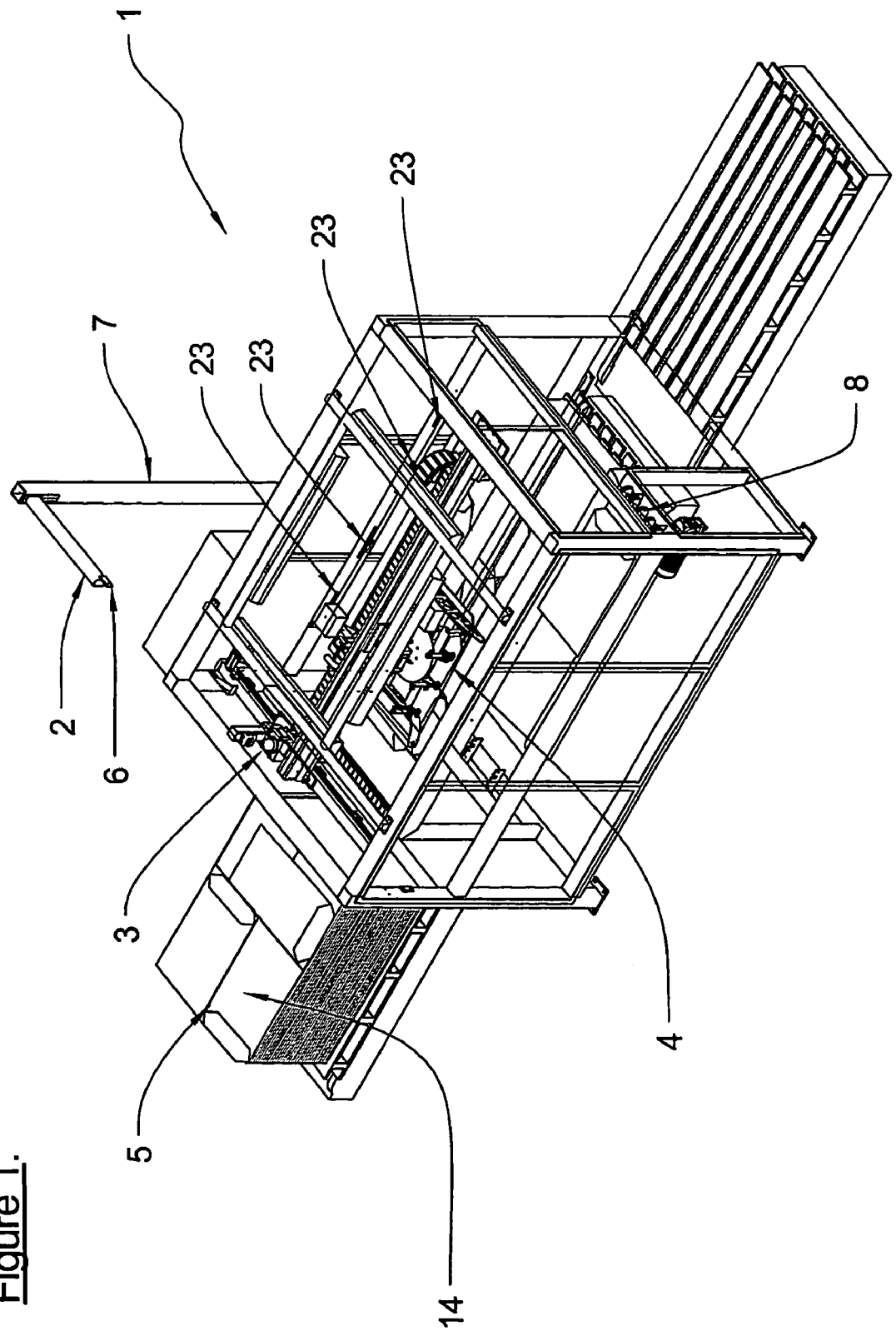
FIG. 1 shows a perspective view of a packaging deployment apparatus configured in accordance with a preferred embodiment of the present invention.

FIG. 1 shows a perspective view of a packaging deployment apparatus (1) configured in accordance with a preferred embodiment of the present invention for use with packaging articles. It will be appreciated the invention is not limited to use with packaging articles, and the following description is purely exemplary FIG. 1 shows a packaging deployment apparatus (1) as configured in accordance with a preferred embodiment of the present invention. The deployment apparatus incorporates a packaging article detector (2), a manoeuvring system (3) and a packaging removal system (4).

The packaging deployment apparatus (1) is adapted to retrieve and remove packaging articles in the form of empty packaging bags (14) (not fully shown) from the top surfaces of loaded pallets (5). A succession of loaded pallets (5) is placed on a conveyor system to move the pallets (5) into the interior of the deployment apparatus (1) for subsequent depalletisation of the bags (14) stacked on the top surface of the pallet (5).

Figure 2:
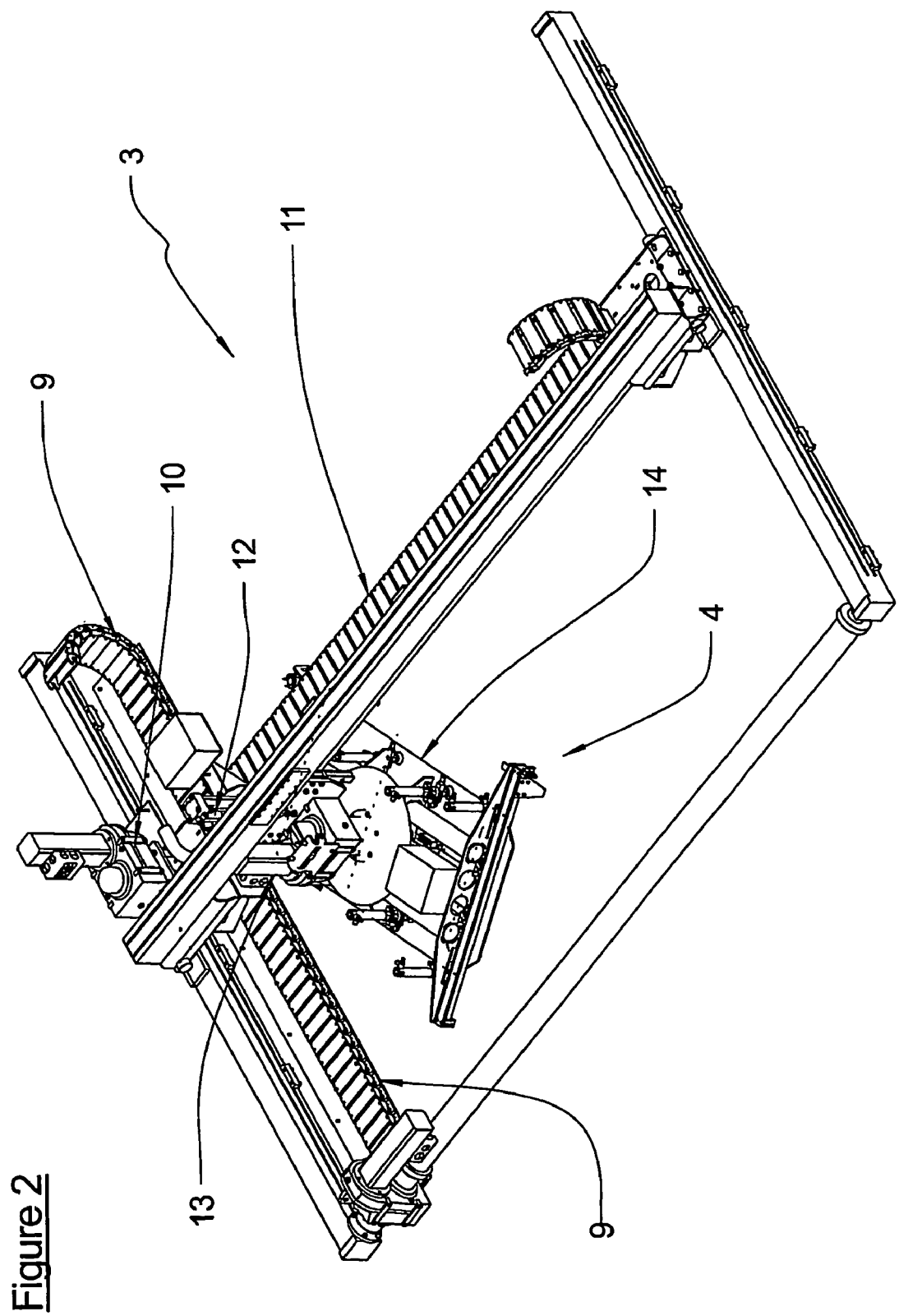
FIG. 2 shows a perspective view of a manoeuvring system and associated packaging removal system employed in the packaging deployment apparatus shown with respect to FIG. 1, and FIGS. 3a, 3b show the operation of the manoeuvring system discussed with respect to FIG. 2.

The packaging article detector (2) incorporates a digital camera system (6) which orientates the camera directly above the top of a pallet from which bags are to be deployed. Digital images acquired by the camera (6) are then used by image processing or object recognition software operating on a processing means (20) (only depicted in FIG. 5) to distinguish at least one predetermined identification feature of the bag such as the perimeter and/or distinctive marking or patterns. According to different embodiments, the predetermined identification features may include discernable colour and/or contrast patterns, advertisings paraphernalia, nutritional information, bar codes, opening instructions, peripheral markings, asymmetrical perimeters, geometrical markings and the like. FIGS. 1-3 show articles in the form of substantially rectangular bags (14) with non-right angle corners at one of the bag (14) together with a geometric pattern (21) caused by the foot of the bag (14) being folded flat before filling. The distinctive outline (22) of the bag (14) in combination with the geometric pattern (21) enables the processing means (20) to determine the bags orientation and position and whether it is overlapped by any other bag (14) and thus concealing part of the perimeter (22) and/or pattern (21).

The processing means (20) may form an integrated component of the packaging article detector (2) or be a separate computing/logical unit located remotely from the apparatus (1).

The processing means (20) compares the acquired image to stored reference image data of the bag (14) in any allowable orientation to determine non-overlapped bags (14) on the top layer or top surface of a pallet (5) and their orientations. The processing means (20) prioritises a bag (14) for selection according to one or more predetermined criteria and issues orientation and position information of the bag selected to the manoeuvring system (3). The criteria for selection may be defined according to the particular characteristics of articles (14) being deployed and may include whether an article is:
- non-overlapped by another article (14); or
- uppermost or outermost from the pallet (5); or
- closest to a designated reference point or axis; or
- closest to alternating designated reference points or axes; or
- located over the position of maximum weight applied by the articles to the pallet (5).

The manoeuvring system (3) (discussed more fully with respect to FIG. 2) incorporates a pair of track and carriage assemblies in addition to a height adjustment mechanism to manoeuvre the packaging removal system (4) within a 3-dimensional range of movement. The manoeuvring system is used to align the packaging removal system (4) with the selected bag (14) to allow the packaging removal system (4) to engage with and remove the selected bag from the surface of the pallet (5).

Once the bag selected for deployment has been engaged by the packaging removal system (4) the manoeuvring system (3) is again operated to position the removal system (4) above a feed-in conveyor (8) (as illustrated in FIGS. 1 and 3) of a production line which receives the deployed orientated bags required.

The manoeuvring system (3) also integrates a pallet lifting drive mechanism (24) (only shown in FIG. 5) which is used to lift a loaded pallet (5) so that the top surface of the loaded pallet (5) is at a position substantially level or parallel with the top surface of the conveyor (8). This pallet lifting drive mechanism (24) can be used to ensure that the top surface of the loaded pallet (5) is retained at approximately the same distance from the tracks of the manoeuvring system (3), irrespective of the actual load currently held on the top of the pallet (5). Height sensors in the form of interruptible beam sensors (23) are located on opposing sides of the deployment apparatus (1) approximately level with the top surface of the conveyor (8). The sensors (23) emit low energy electromagnetic beams in a horizontal plane to a corresponding receiver portion of the sensor (23). Interruption of the beam by the stacked articles (14) is thus detected by the sensor receiver. In the embodiment shown, the drive mechanism (24) lifts the pallet (5) until the beam from the sensor (23) is interrupted, thus maintaining the top of the stacked articles at the optimum height for deployment.

FIG. 2 shows in detail, components of the manoeuvring system (3) and also the packaging removal system (4) discussed with respect to FIG. 1.

The manoeuvring system (3) incorporates a pair of tracks and carriages orientated in a substantially horizontal plane. The first track (9) carries an initial carriage (10) on which the second track (11) is located. The second track (11) in turn carries a second carriage (12) on which a vertical adjustment head (13) is disposed. The vertical adjustment head (13) in turn is connected to the packaging removal system (4) and in use allows for limited vertical travel or displacement of the head relative to the carriages of the manoeuvring system (3). The vertical adjustment head (13) may also rotate the removal system (4) in a substantially horizontal plane.

As can be seen from FIG. 2, the pair of tracks (9, 11) are orientated substantially at right angles with respect to one another and therefore allow for the manoeuvring of the removal system (4) over a substantially horizontal plane. The vertical adjustment head (13) in turn allows for limited vertical displacement of travel of the removal system (4) to in turn move the system into contact with bags (14) located on the top surface of a loaded pallet (not shown). The orientation of the removal system (4) can also be modified through a rotation effect applied by the vertical adjustment head (13).

Figure 3A:
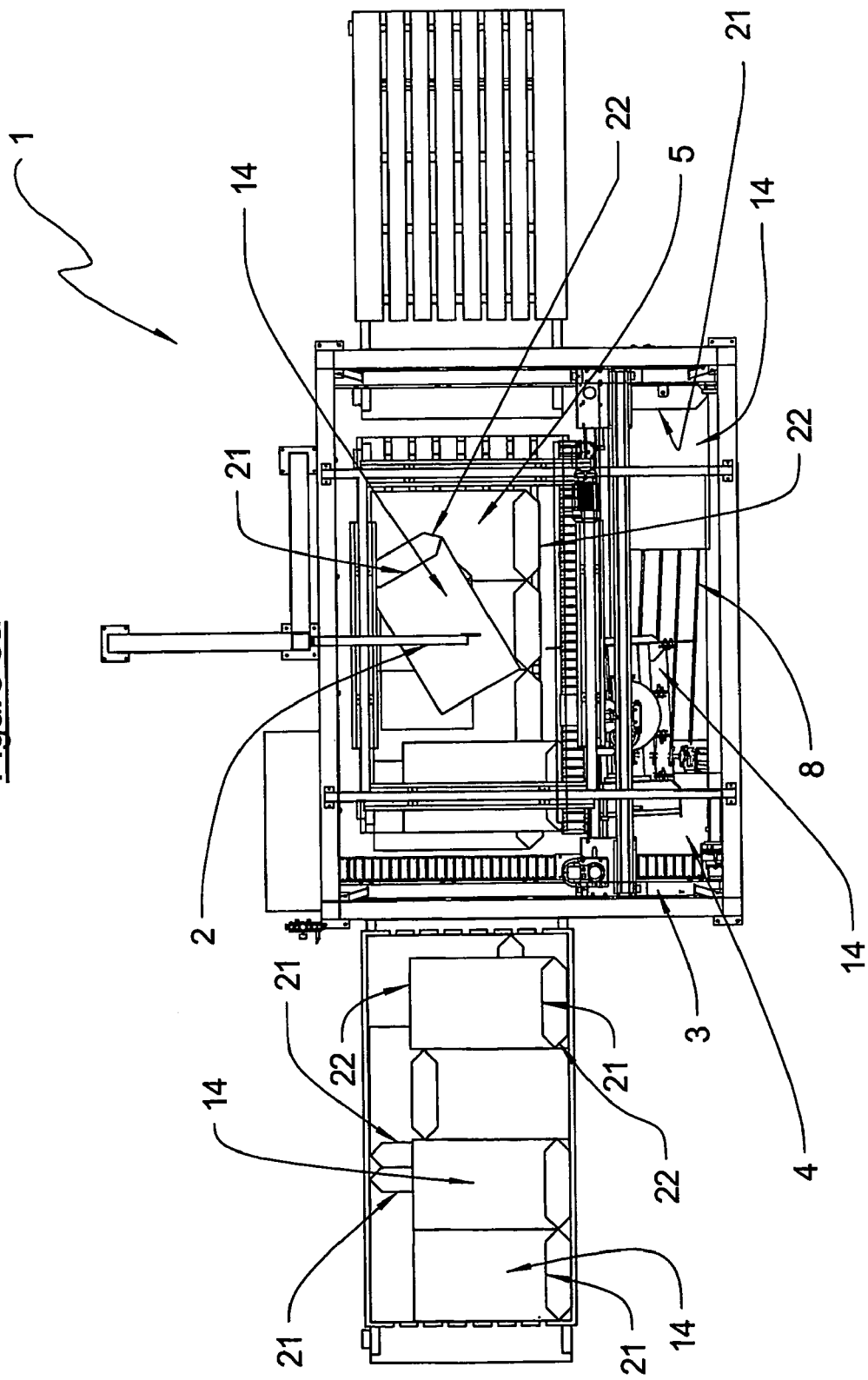
Figure 3B:
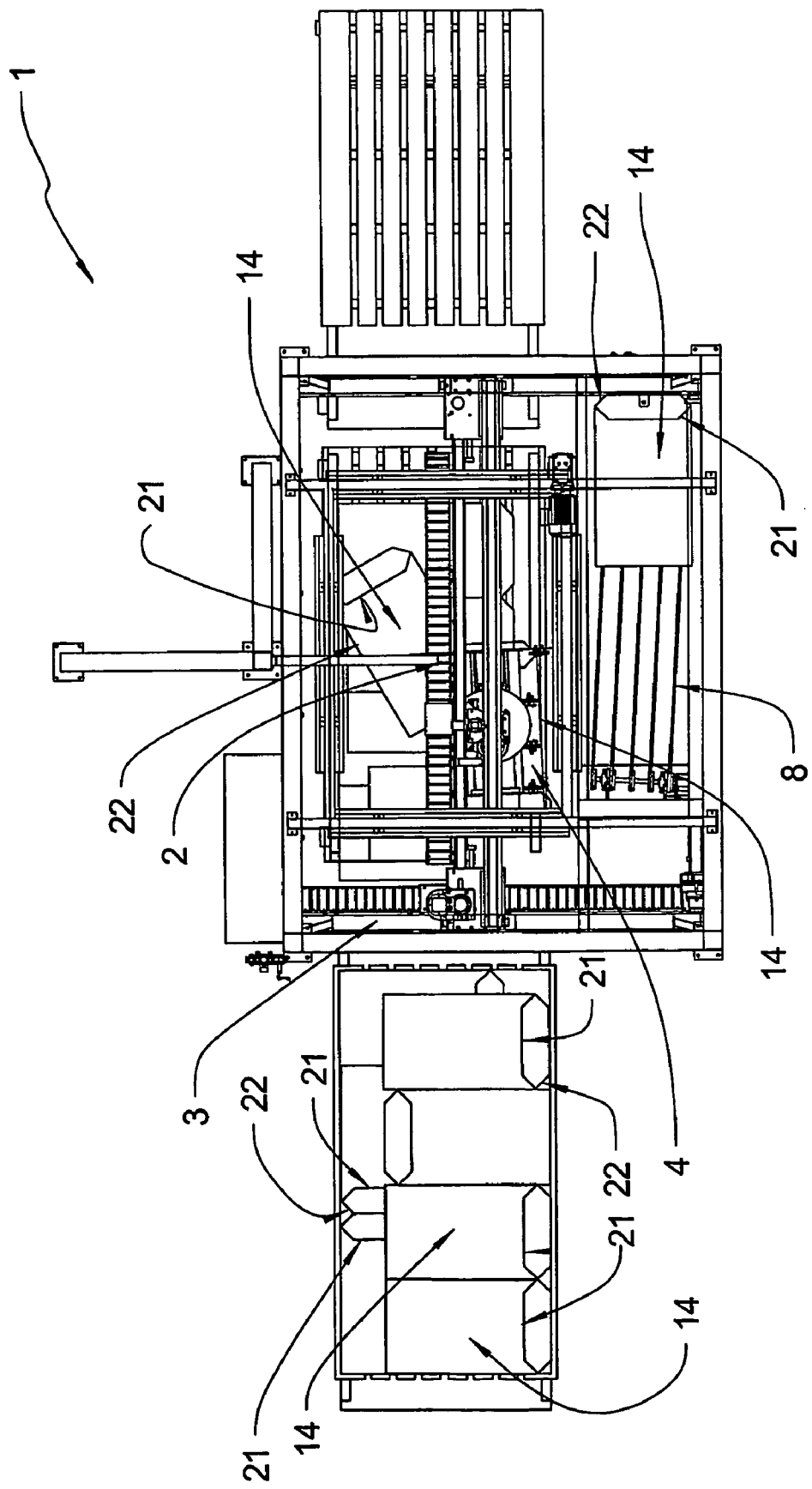

FIGS. 3a, 3b show the operation of the manoeuvring system discussed with respect to FIG. 2.

FIGS. 3a, 3b show a top plan view of the deployment apparatus illustrated with respect to FIG. 1. These figures illustrate the operation of the manoeuvring system (3) discussed to facilitate the deployment of bags (14) in a standard orientation onto a conveyor system (8). As can be seen from FIG. 3a, each of the bags (14) on the top surface of the pallet (5) may have a number of variable orientations. The manoeuvring system (3) is employed to manoeuvre and orientate the removal system (4) into an orientation complimentary to that of a bag (14) selected for deployment to the conveyor line (8).

The packaging article detector (2) initially obtains a top-down image of the top surface of the pallet (5) and subsequently identifies the perimeter (22) of a single non-overlapped bag (14) which it has selected for deployment. The manoeuvring system (3) is then activated, where FIGS. 3*a* and 3*b* show variable positions for the removal system (4) depending on the operation of manoeuvring system (3). As can be seen from FIGS. 3*a* and 3*b*, the tracks and carriages of the manoeuvring system (3) can be used to adjust the position of the removal system (4) in a substantially horizontal plane to position the removal system (4) directly over bags on the pallet (5) or over the conveyor line (8). FIG. 3*b* shows the removal system (4) with a bag (14') attached, ready for deployment to the conveyer line (8).

FIG. 4 shows a perspective view of the packaging removal system (4) illustrated in FIGS. 1 and 2.

The packaging removal system (4) includes a plurality of retention means, formed in the embodiment shown by a number of vacuum cups (15). The vacuum cups (15) are deployed on a main mounting frame, indicated by arrow 16, of the system and form a linear array of retention mechanisms to be engaged with the top surface of a bag to be deployed.

The removal system (4) also includes an array of three distinct parting elements (17*a*, 17*b*, 17*c*) located at either end of the main mounting frame (16). The parting element (17*a*) includes a projecting body which is adapted to move on a linear track (18) along the edge of the frame (16). When the linear parting element (17*a*) is used, its projecting body will in turn move along the edge or end of a bag retained by the vacuum cups (15).

Conversely the remaining parting elements (17*b*, 17*c*) are configured as pivoting parting blades with each body being adapted to pivot from the position shown with respect to FIG. 4 through a substantially 90° range of motion to scribe an arc underneath the surface of a bag engaged by the vacuum cups (15).

The packaging removal system (4) is adapted to implement a staged lifting process with respect to a bag to be deployed. In the embodiment shown, each array of vacuum cups (15) are engaged and connected directly to the top surface of a bag to be deployed. Each vacuum cup (15) also includes an actuator shaft portion (19) which allows the cup to be moved up or down relative to the main frame (16). This drive shaft (19) is initially operated with respect to the vacuum cup shown in the top left hand side of FIG. 4 to lift the top left hand corner of the bag to be deployed. Once this corner of the bag has been lifted the linear parting element (17*a*) is engaged or operated to slice across the underside and top end of the bag, severing any connection to the adjacent bag on the stack below.

At this stage all the remaining vacuum cups' (15) actuator shafts (19) may then be operated to lift the remaining portions of the bag, thereby providing further space within which each of the main bodies of the pivoting parting elements (17*b*, 17*c*) can project. These pivoting parting elements (17*b*, 17*c*) are then operated to sweep across the bottom end corners of the bag (14) to sever any adhesion between the bottom seam of the bag (14) and the adjacent bag (14) on the stack below. Once the remaining parting elements have been activated, the entire removal system (4) can be lifted out away from the top of pallet and manoeuvred over the production line conveyor belt (not shown).

Figure 5:
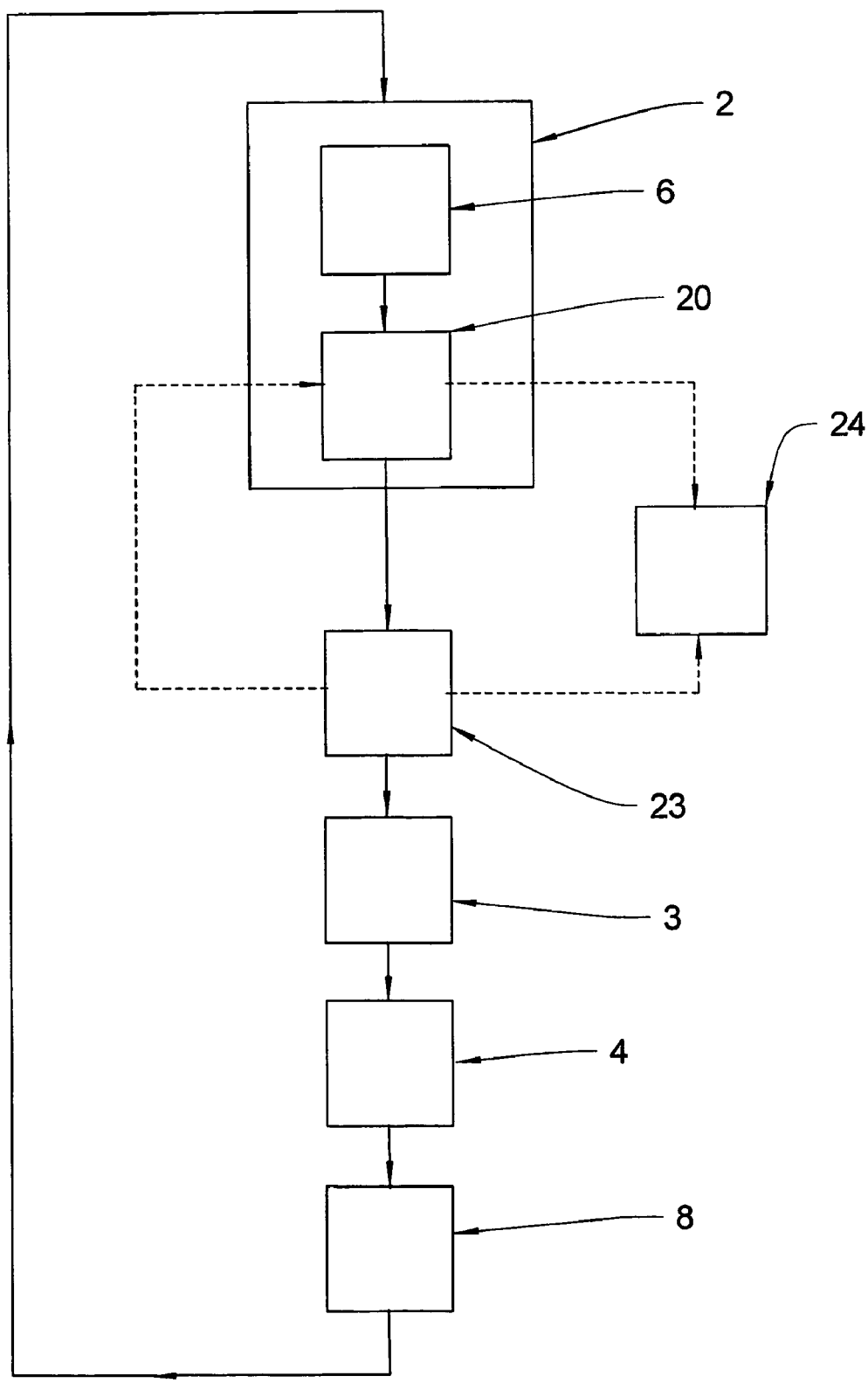
FIG. 5 shows a schematic diagram of the process involved in the deployment of an article according to a preferred embodiment.

FIG. 5 shows a system diagram providing a schematic representation of the deployment apparatus (1) operation. The packaging article detector (2) incorporating a digital camera system (6) acquires an image which is analysed by the processing means (20).

A height based sensor system (23) determines the height of the articles (14) above the base of the support surface (5) and (optionally) passes this information to the processor (20), which in turn controls the pallet lifting drive mechanism (24). Alternatively, the height sensor (23) may provide direct input to the pallet lifting drive mechanism (24) such that each time the upper surface of the articles (14) on the pallet (5) falls below a certain point, the drive mechanism (24) raises the pallet (5).

The processor (20) uses optical recognition algorithms to identify predetermined identification feature of the bag (14) such as the perimeter (21) and/or distinctive marking or patterns portions (22) in the acquired image by reference to reference image data stored in the processing means (20). The processor (20) then selects an non-overlapped article (14) for removal based on the height and/or location and/or orientations of the articles. Generally the topmost or most easily accessible article (14) is selected for deployment. However it will be appreciated that any particular criteria may be used to select an article (14) for removal. The location, height and orientation information of the selected article is transmitted to the manoeuvring means (3) which then moves the removal system (4) into position over the selected article (14). The removal system (4) engages with and subsequently removes the selected article (14) from the support surface (5). The removal system (4) may orientate the selected article to a predetermined orientation if the selected article is not already in such an orientation. The manoeuvring means (3) then manoeuvres the removal system (4) over the conveyor line (8). The selected article is then released onto the conveyer line (8) for subsequent processing, e.g. filling the bags (124) with milk powder. Once the article (14) is released the process is repeated until the pallet (5) is cleared of articles (14).

Aspects of the present invention have been described by way of example only and it should be appreciated that modifications and additions may be made thereto without departing from the scope thereof.

The invention claimed is:

1. A deployment system adapted to remove articles stacked on a support surface, said articles being located in a plurality of orientations and/or positions on said support surface, said deployment system comprising:

a height sensor system including a transmitter to one side of the stack of articles and a corresponding receiver to another side of the stack of articles directly opposite the transmitter, the transmitter and receiver being fixed in position in the same horizontal plane;

a drive mechanism configured to raise the support surface automatically until an uppermost article on the support surface interrupts a beam between the transmitter and the receiver;

an article detector configured to determine an orientation and position of at least one non-overlapped article located on said support surface, the article detector including a single camera only, the camera located in a fixed position directly above a work surface which contains the uppermost articles in the stack, and a processing means for receiving an image from the single camera and programmed to identify one or more predetermined identification features present on each article and to determine a selected article priority for removal from the work surface based on an article selection algorithm;

a removal system configured to engage with and remove an article from said support surface; and a manoeuvring system configured to position the removal system to engage with a selected article having the highest priority for removal and move the selected article to a predetermined position and/or orientation.

2. A deployment system as claimed in claim 1, wherein the article detector, removal system and manoeuvring system are formed as a combined device.

3. A deployment system as claimed in claim 1, wherein the manoeuvring system is configured to align the removal system with an orientation of the selected article.

4. A deployment system as claimed in claim 1, wherein the single camera is a digital camera.

5. A deployment system as claimed in claim 1, wherein said predetermined identification features include one or more of: discernable colour and/or contrast patterns; advertising paraphernalia; nutritional information; bar codes; opening instructions; peripheral markings; asymmetrical perimeters; and/or geometrical markings.

6. A deployment system as claimed in claim 1, wherein identification of one or more said predetermined identification features enables the orientation of a bag to be determined.

7. A deployment system as claimed in claim 6, wherein determination of the article orientation allows the perimeter or edges of an article to be identified through interpolation from known article dimensions.

8. A deployment system as claimed in claim 1, wherein said processing means is programmed to operate edge contrast detection algorithms to detect an article perimeter and subsequently determine and indicate an orientation of an article.

9. A deployment system as claimed in claim 1, wherein said processing means is programmed to recognise one or more predetermined identification features on the article throughout a range of possible orientations.

10. A deployment system as claimed in claim 9, wherein said processing means is programmed to recognise one or more predetermined identification features on the article throughout a range of possible orientations, proximity and/or perspective variations of the article with respect to the article detector.

11. A deployment system as claimed in claim 1, wherein the processing means is interfaced with a reference image database of reference images of articles including at least one predetermined identification feature at known article orientations.

12. A deployment system as claimed in claim 11, wherein the processing means is programmed to compare the image acquired by the article detector with said reference image database to determine the orientation of the article.

13. A deployment system as claimed in claim 12, wherein said determination includes weightings for at least one of:
positional correctness;
image match with at least one predetermined identification feature;
size; and
scaling comparison with said reference images.

14. A deployment system as claimed in claim 12, wherein said processing means is programmed to determine the priority of articles to be selected for engagement with the removal system after comparison of the acquired image to the reference image database and determining the position and orientation of one or more articles.

15. A deployment system as claimed in claim 14, wherein the priority for designating successive articles for selection is restricted to articles being:
non-overlapped by another article; or
uppermost or outermost from the support surface; or
closest to a designated reference point or axis; or
closest to alternating designated reference points or axes; or
located over the position of maximum weight applied by the articles to the support surface.

16. A deployment system as claimed in claim 14, wherein the processing means associated with the article detector is capable of determining a selected article priority by utilising an article selection algorithm.

17. A deployment system as claimed in claim 16, wherein said article selection algorithm is programmed to incorporate the orientations of articles available for deployment in conjunction with the position, proximity to the removal system and height of the article to the removal system.

18. A deployment system as claimed in claim 1, wherein the processing means determines the article uppermost from the support surface in conjunction with positional height information feedback from said height position sensor system.

19. A deployment system as claimed in claim 18, wherein said positional height information from the height position sensor system is used in conjunction with selection algorithms employed by the article detector to select and engage a particular article.

20. A deployment system as claimed in claim 1, wherein said height position sensor emits electromagnetic spectrum energy across the work surface.

21. A deployment system as claimed in claim 1, wherein the article detector is configured to transmit the orientation and position of the selected article to said manoeuvring system, said manoeuvring system configured to orientate said removal system for engagement with the selected article.

22. A deployment system as claimed in claim 1, wherein said manoeuvring system includes an articulated robotic arm with said removal system attached to a free end of the articulated arm.

23. A deployment system as claimed in claim 1, wherein said manoeuvring system includes an array of tracks and carriages which can manoeuvre a removal system head within a substantially horizontal plane orientated parallel to the top surface of the work surface.

24. A deployment system as claimed in claim 23, wherein the manoeuvring system includes a height adjustment system configured to adjust the height of the removal system head relative to the articles on the work surface.

25. A deployment system as claimed in claim 24, wherein the removal system head is mounted by a drive shaft which can be raised, lowered, or rotated by components of the manoeuvring system.

26. A deployment system as claimed in claim 24, wherein said height adjustment system includes pallet height-adjustment systems configured to lift or lower a pallet loaded with articles to adjust the height of the articles to be deployed with respect to the removal system.

27. A deployment system as claimed in claim 1, wherein said removal system includes at least one retention mechanism adapted to removably connect an article to the removal system.

28. A deployment system as claimed in claim 27, wherein the retention mechanism is configured to grasp the selected article from the work surface whereby subsequent movement of either the retention mechanism or alternatively the entire removal system will result in the removal of the selected article from the work surface.

29. A deployment system as claimed in claim 27, wherein said retention mechanism is configured to be moveable relative to a base mounting frame of the removal system.

30. A deployment system as claimed in claim 27, wherein said retention mechanism is selected from the group comprising one or more: vacuum cups; electrostatically charged pads; mechanical grasping hands; clamps; and tacky adhesive based systems.

31. A deployment system as claimed in claim 27, wherein said removal system includes a plurality of retention mechanisms disposed in a regular array along, or on, a mounting frame of the removal system.

32. A deployment system as claimed in claim 1, wherein said removal system includes at least one parting element adapted to at least partly project between the selected article engaged by the removal system and an adjacent article located beneath the selected article.

33. A deployment system as claimed in claim 32, wherein a portion of the parting element which is to project between the selected article to be deployed and the adjacent article on a stack of articles is adapted to move across the underside of the selected article for deployment to sever connections or attachments between the two adjacent articles.

34. A deployment system as claimed in claim 32, wherein the projecting portion of the parting element is configured to sweep across or through an area on the underside of an article to free the article for deployment.

35. A deployment system as claimed in claim 32, wherein a body of the parting element in operation is pivotable through an arc underneath the surface of the selected article.

36. A deployment system as claimed in claim 32, wherein the parting element is configured to move linearly, parallel to a peripheral edge of the article.

37. A deployment system as claimed in claim 32, wherein the removal system includes a plurality of parting elements to sever connections between the joined articles.

38. A method of deploying articles using a deployment apparatus adapted to remove articles located on a support surface, said articles being located in a plurality of orientations and/or positions on said support surface, said deployment apparatus including, a height position sensor system including a transmitter on one side of the stack of articles and a corresponding receiver on another side of the stack of articles directly opposite the transmitter, the transmitter and receiver being fixed in position in the same horizontal plane, a drive mechanism configured to raise the support surface, an article detector configured to determine an orientation and position of at least one non-overlapped article located on said support surface, the article detector including a single camera only, the camera located in a fixed position directly above the stack of articles on the support surface, a processor, a removal system, and a manoeuvring system configured to position the removal system, said method of deployment comprising:

raising the support surface with the drive mechanism until an uppermost article on the support surface interrupts a beam between the transmitter and the receiver of the height positioning sensor system;

operating the single camera to obtain an image of the articles on a work surface which contains the uppermost articles in the stack and sending the image to the processor;

processing the image with the processor to identify one or more predetermined identification features present on each article and to determine a selected article priority for removal from the work surface based on an article selection algorithm programmed into the processor;

determining an orientation and position of a selected article having the highest priority for removal using the article detector;

transmitting the orientation and position of the selected article to said manoeuvring system;

operating the manoeuvring system to manoeuvre the removal system into position to engage with the selected article;

engaging the selected article with the removal system and moving the selected article to a predetermined position and orientation using the manoeuvring system; and repeating the above steps as required until all articles in the stack are removed.

* * * * *